July 19, 1932. C. S. BROWN 1,868,045
MOTOR AGRICULTURAL MACHINE
Filed March 28, 1928 4 Sheets-Sheet 3

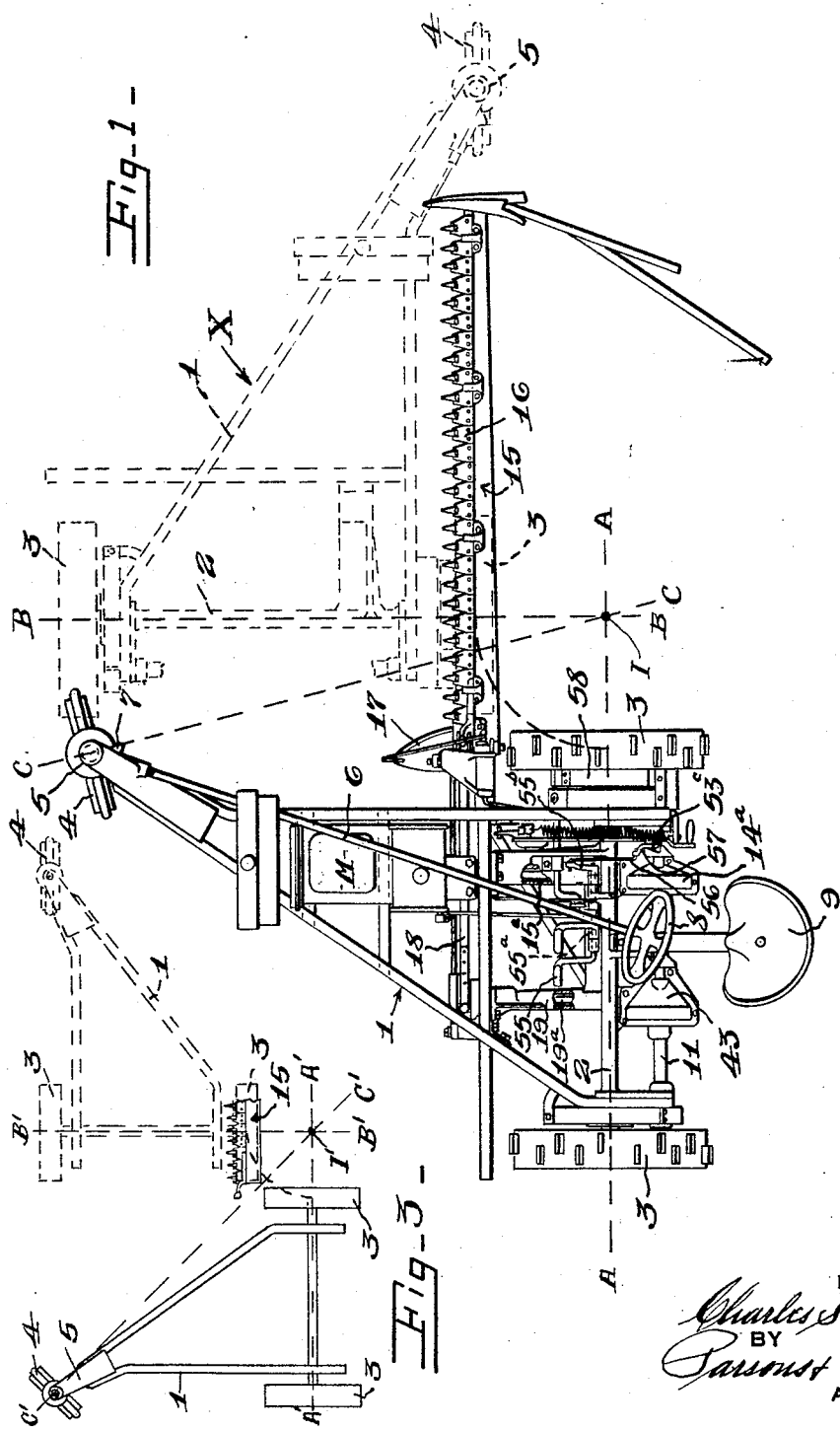

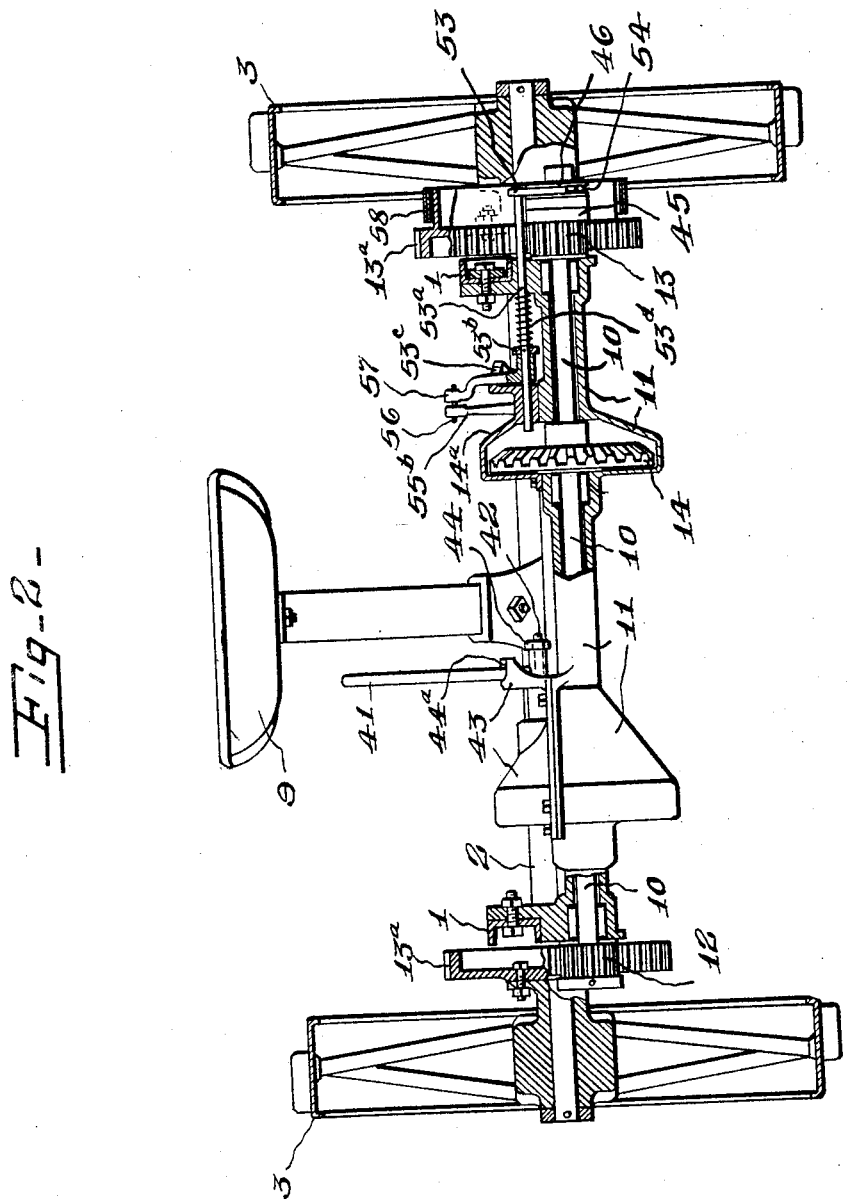

INVENTOR
Charles S. Brown
BY
Parsons & Bodell
ATTORNEYS.

July 19, 1932.   C. S. BROWN   1,868,045
MOTOR AGRICULTURAL MACHINE
Filed March 28, 1928   4 Sheets-Sheet 4
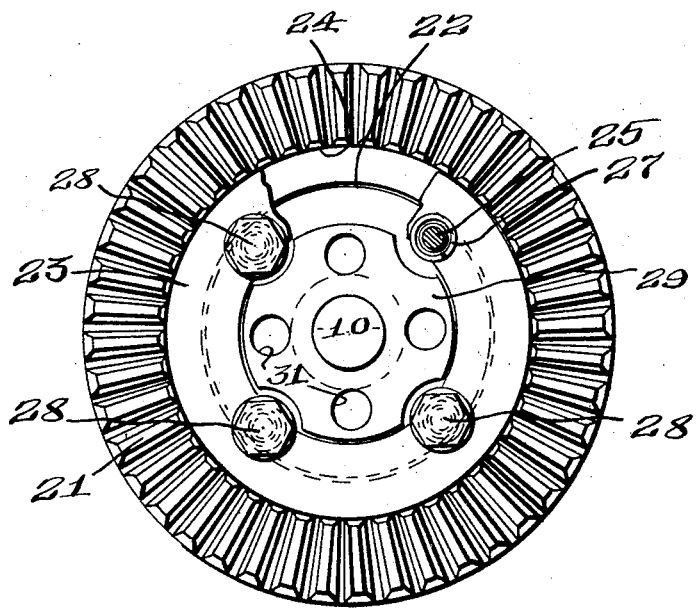
Fig-6-
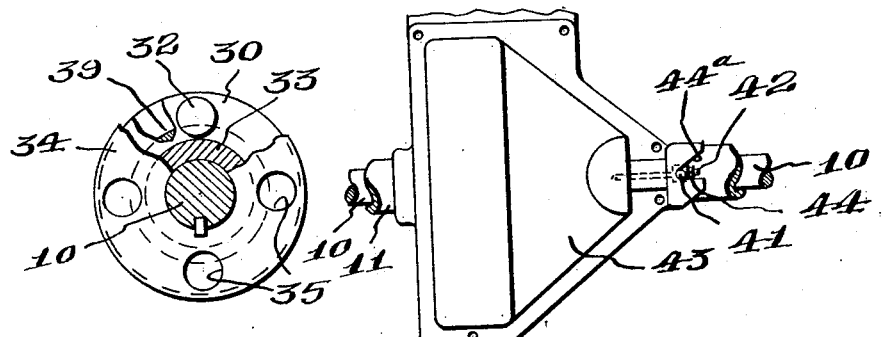
Fig-7-   Fig-8-
INVENTOR
Charles S. Brown
BY
Parsons & Bodell
ATTORNEYS.

Patented July 19, 1932

1,868,045

UNITED STATES PATENT OFFICE

CHARLES S. BROWN, OF SYRACUSE, NEW YORK

MOTOR AGRICULTURAL MACHINE

Application filed March 28, 1928. Serial No. 265,339.

This invention relates to motor agricultural machines such as mowers and has for its object a particularly simple and efficient arrangement of the driving and steering wheels, and actuating mechanism for the driving wheels, and also actuating mechanism for the movable member of the implement as the mower knife, and further has for its object a particularly simple and efficient brake mechanism for this type of agricultural machine.

The invention consists in the novel features and in the combinations and constructions hereinafter set forth and claimed.

In describing this invention, reference is had to the accompanying drawings in which like characters designate corresponding parts in all the views.

Figure 1 is a plan view of a motor mower embodying my invention, the operation of the machine when turning a corner being shown.

Figure 2 is a rear elevation, partly in section and parts being removed, of this motor mower.

Figure 3 is a diagrammatic plan view similar to Figure 1 of a slightly different arrangement of the steering and driving wheels and the mower knife.

Figure 4:
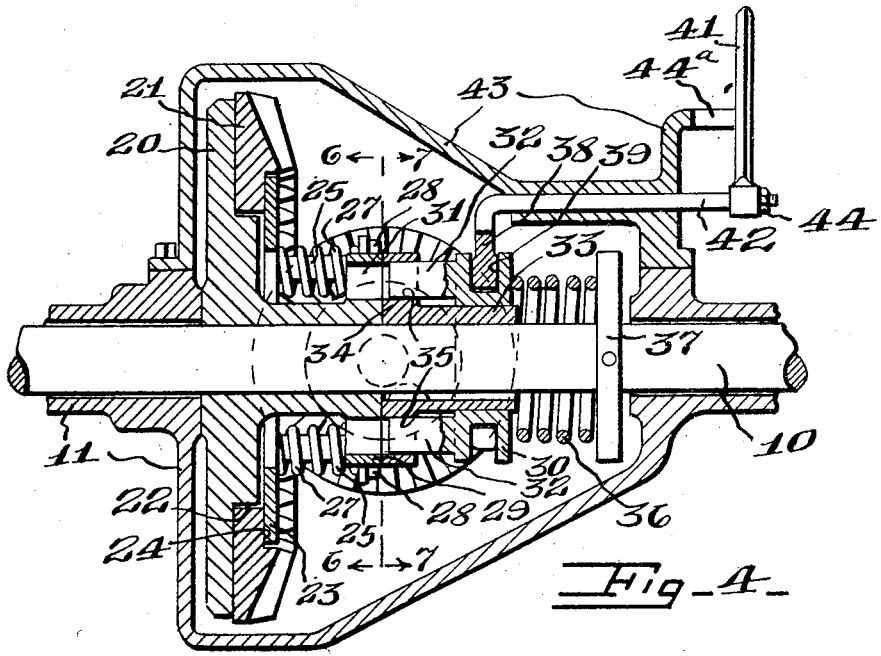
Figure 4 is an enlarged transverse fragmentary sectional view through the friction clutch and contiguous parts.

Figures 6 and 7 are sectional views, partly broken away on lines 6—6 and 7—7 respectively Figure 4.

Figure 8 is a plan view of the cover for parts shown in Figure 4.

Figure 9:
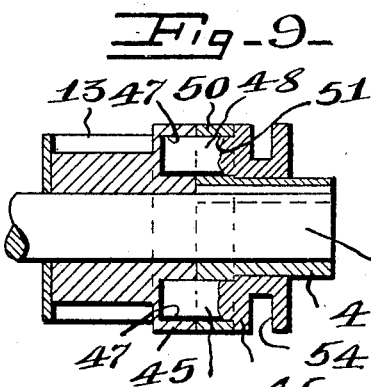

Figure 9 is a sectional view of the clutch connecting one of the driving wheels and the drive shaft.

Figure 10:
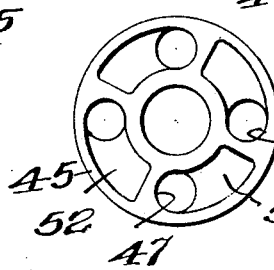

Figure 10 is a face view of one of the clutch members shown in Figure 9.

The machine comprises generally a frame, driving wheels supporting the rear end of the frame and arranged in axial alinement, motor means carried by the frame for driving said wheels, operator controlled means for disconnecting one of the drive wheels from the driving mechanism, a steering wheel arranged at the front of the frame in line with one of the driving wheels and means for operating the steering wheel.

1 designates a frame which may be of any suitable form, size and construction, it being here shown as in a general form of a right triangle.

The detail features of the frame construction form no part of this invention but some of them constitute the subject matter of my pending applications, Sr. Nos. 439,183, filed March 26, 1930, and 491,804 filed October 28, 1930.

2 is an axial housing extending transversely of the frame and 3 are the drive wheels mounted on the ends of the axle in said housing to rotate about the axle.

4 is the steering wheel mounted in a suitable head 5 at the front end of the frame with the wheel normally in line with one of the wheels 3, and preferably, with the wheel which is next to the shoe at the inner end of the mower knife. This wheel is operated manually by means of a rod 6 connected at 7 to the spindle of the fork in any suitable manner to turn the fork, and hence, to change the angle of the steering wheel 4. The rod 6 extends to the rear of the machine where it is provided with a hand wheel 8 located within reach of the driver's seat 9.

The motor means includes an internal combustion engine M and connections between the crank shaft of the engine and the drive shaft for the drive wheels 3.

10 (Figure 2) designates the drive shaft mounted in a suitable housing 11 (Figure 6) in the rear of the axle housing 2; this shaft having pinions 12, 13 at its ends which mesh with gears 13ª (Figure 2) mounted on and rotatable with the wheels 3, one of the pinions as 12 being fixed to the shaft, and the other being connected to the shaft through a clutch mechanism to be presently described.

The shaft 10 has a ring gear 14, Figure 2, thereon located within the housing, which ring gear is connected to the crank shaft of the engine through the usual propeller shaft and driving pinion, the former being located in the tube 15ª, Figure 1. The ring gear rotates with the drive shaft and there are no driving shaft sections and differential gearing. The actuation of the propeller shaft is controlled through the usual pedal operated clutch.

15 is a mower bar having the usual reciprocating knife 16, the mower bar extending laterally from the frame and having a shoe 17 at its inner end arranged directly in front of one of the drive wheels 3 and preferably ahead of the wheel which is disconnectable from the driving mechanism. The knife 16 is reciprocated through the usual pitman 18 which is connected at one end to the knife and its other end to a crank on a shaft in the tubular housing 19 in the usual manner, this shaft being driven from the shaft 10 through mechanism to be hereafter described.

This mechanism comprises inner and outer sections as a disk 20 mounted on the shaft 10, a ring gear 21 mounted on the hub or annular shoulder 22 on the disk 20 and frictionally engaging the disk 20, friction means for holding the ring gear frictionally engaged with the disk 20, and a manually operable positive clutch for connecting and disconnecting the disk 20 and the shaft 10.

The ring gear 21 is held in frictional engagement with the disk 20 by a spring pressed friction disk 23 located in an annular recess 24 in the ring gear 21 and mounted upon studs 25 extending from the hub 22 of the disk 20 through the central opening of the ring gear and through openings 26 in the disk 23. This disk 23 is pressed into frictional engagement with the bottom of the recess 24 by springs 27 encircling the studs and interposed between the friction disk 23 and the heads 28 of the studs. The springs 27 thus thrust the friction disk 23 against the bottom of the annular recess 24 in the ring gear and also thrusts the ring gear 21 against the side face of the disk 20. This friction feature permits slipping of the ring gear 21 relatively to the disk 20 or rotation of the shaft 10 relatively to the movement of the knife when there is any abnormal obstruction resisting the movement of the mower knife 16. The slip clutch and its relation to the knife drive shaft 19ª, and to jack shaft 10 constitutes the subject matter of my pending application, Sr. No. 454,256, filed May 21, 1930, now Patent No. 1,825,574, dated September 29, 1931.

Figure 5:
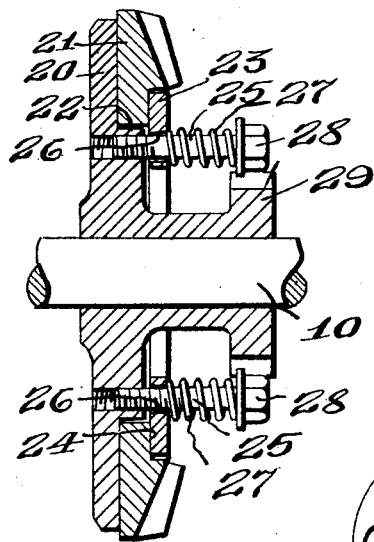
Figure 5 is a detail view of the friction clutch.

The positive clutch for connecting and disconnecting the disk 20 and associated parts from the shaft 10 comprises a clutch member 29 (Figures 4, 5 and 6) rotatable with the disk 20 and a shiftable clutch member 30 rotatable with the shaft 10, the clutch section 29 having holes 31 for receiving pins 32 associated with the clutch member or collar 30. The clutch member or collar 30 is here illustrated as not mounted directly upon the shaft but upon the hub 33 of a collar 34, which collar is provided with guide holes 35 for the pins 32. The collar 30 is slidable on the hub 33 and the hub 33 is keyed to the shaft 10. A spring 36 encircles the shaft 10 and is interposed between the clutch member 30 and a fixed collar 37 on the shaft 10. The clutch member 30 normally tends to hold the pins 32 in the holes 31 of the clutch member 29, these pins being arranged in the guide holes 35.

The clutch member or collar 30 is shifted against the action of the spring 36 by a suitable mechanism comprising a fork 38 engaged with a groove 39 in the collar 30.

The means for operating the fork 38 comprises a lever 41 loosely mounted on a shaft 42 axially slidable in the housing cover 43 for the ring gear 21 and associated clutch parts, the lever 41 thrusting in one direction against a collar 44 on the shaft 42 and in the other direction against a cam 44ª on the housing 43. Rocking of the lever 41 causes it to ride up the cam 44ª and shift the shaft 42 axially against the returning action of the spring 36.

Upon operation of the lever 41, Figure 4, the ring gear 21 is disengaged from the shaft 10 so that the mower knife is idle, in case it is desired to drive the mower without running the knife. Also, it is to be understood that the mower bar may be raised and lowered from horizontal to vertical and vice versa by any well known mechanism.

The mechanism for connecting and disconnecting the driving pinion 13 from the shaft 10 comprises a clutch section 45 associated with the pinion 13 and a shiftable clutch section 46 rotatable with the shaft 10.

The section 45 (Figure 9) is here shown as a collar rotatable with the pinion 13 and having holes 47 therein. The section 46 is here shown as a collar connected to the shaft to rotate therewith and having pins 48 shiftable into and out of the holes 47. The collar 46 is not mounted directly on the shaft 10 but on the hub 49 of a collar 50 which has guide holes 51 in which the pins are located, the hub 49 being keyed to the shaft 10. Also, the guide holes 47 are provided with inclined entrance or guides 52 for the pins 48. The collar 45 is integral with the pinion 13 at one end of the pinion.

The collar 46 is operated by means of a fork 53, Figure 2, engaged in a groove 54 in the collar 46, which fork is operated by a lever 55, Figure 1, and a link 56 connecting the lever 55 and a rocker arm 57 loosely mounted on the shaft 53ª (Figure 2) on which the fork is mounted; the shaft being slidably mounted in the housing cover 14ª and the rocker arm 57 thrusting in one direction against a fixed collar 53ᵇ on the shaft 53ª and in the other direction against a cam 53ᶜ on the housing 14ª. The sliding of the shaft is against the action of a returning spring 53ᵈ. The lever 55 is connected to the link 56 through a rocker shaft 55ᵃ having an arm 55ᵇ to which the link is pivoted. Obviously, upon the depression of the lever 55, the clutch section or collar 46 will be operated to disengage the pins 48 from the openings 47 permitting the adjacent ground wheel 3 to run free of the shaft 10.

The machine is also provided with a brake band 58 on the disconnectable wheel which works in conjunction with this wheel when disconnected to facilitate corner turning besides operating to apply braking effect to both wheels 3 when one wheel is not disconnected from the driving axle 10, both wheels being driven by pinions fastened on the same shaft 10, this band then normally acts on both wheels with equal effect through the shaft.

In Figure 1, the steering wheel 4 is shown as normally in alinement with the ground wheel adjacent the standing crop side of the machine and upon turning of the wheel into the angular position shown in Figure 1, the machine will turn to the right into position X shown in Figure 1, the right hand drive wheel 3 being disconnected from the driving mechanism during the turning, the center of turning of the machine being substantially at the intersection I of the axes A—A, B—B of the rear wheels just before turning of the corner and directly after the corner is turned. The angle of the steering wheel required is indicated by the angle CIA.

In the form shown in Figure 3, the steering wheel is arranged in alinement with the drive wheel remote from the standing crop and the machine turns to the right about the same axis as the machine shown in Figure 1, but the angle of the steering wheel is less as shown by the angle C′ I′ A′. On account of the less angularity of the steering wheel in the form shown in Figure 4, this form is preferable in this regard. The steering wheel is limited in its extreme turned or angular position by suitable stops to pivot about the turning point I.

What I claim is:

1. A motor agricultural machine comprising a frame, driving wheels supporting the rear end of the frame and arranged in transverse axial alinement, motor means carried by the frame for driving said wheels, operator controlled means for disconnecting one of the drive wheels from the motor mechanism, means for braking said disconnected wheel, a steering wheel arranged at the front of the frame in line with one of the driving wheels and means for operating the steering wheel.

2. A motor agricultural machine comprising a frame, driving wheels supporting the rear end of the frame and arranged in transverse axial alinement, motor means carried by the frame for driving said wheels, operator controlled means for disconnecting one of the drive wheels and the motor mechanism, means for braking said disconnected wheel, a steering wheel arranged at the front of the frame in line with the drive wheel which is disconnectable from the driving means and means for operating the steering wheel.

3. An agricultural machine comprising a frame, driving wheels supporting the rear end of the frame and arranged in transverse axial alinement, mechanism for driving the wheels including manually operable means for disconnecting one of the wheels from the driving mechanism, means for holding said disconnected wheel against rotation, a steering wheel at the front of the frame in line with the drive wheel disconnectable from the driving mechanism, means for operating the steering wheel, and a mower bar extending laterally from the frame and having a shoe at its inner end directly in front of the driving wheel which is disconnectable from the driving mechanism.

4. An agricultural machine comprising a frame, driving ground wheels supporting the frame, driving mechanism including a shaft, a mower knife carried by the frame and means for actuating the knife including connections between the shaft and the knife, said connections comprising concentric driving and driven sections, the driving section mounted on the shaft and a rotatable relatively thereto, friction means normally engaging said sections, the section mounted on the shaft having a clutch member associated therewith, a second clutch member mounted on and rotatable with the shaft and shiftable into and out of engagement with the first clutch member and manual means for operating the shiftable clutch member.

5. An agricultural machine comprising a frame, driving ground wheels supporting the frame, driving mechanism including a shaft, a mower knife carried by the frame and means for actuating the knife including connections between the shaft and the knife, said connections comprising a friction clutch for permitting relative rotation of the shaft when the operation of the knife is obstructed and a positive clutch comprising a shiftable member for disconnecting the connection from the shaft, and means for shifting the shiftable clutch member.

6. An agricultural machine comprising a frame, driving ground wheels, a drive shaft for said wheels, both wheels being normally connected to the shaft to rotate therewith and means for disconnecting one of the ground wheels from the shaft and connecting the same thereto at will, means for holding the disconnected wheel against rotation, a steering wheel arranged at the front of the frame in line with the ground wheel which is disconnectable from the drive shaft, and a mower bar carried by the frame and extending laterally therefrom and having a shoe at its inner end in front of the ground wheel which is disconnectable from the drive shaft.

7. A motor agricultural machine comprising a frame, driving wheels supporting the rear end of the frame and arranged in transverse axial alinement, motor means carried by the frame for driving said wheels, operator controlled clutch means for disconnecting one of the drive wheels from the motor mechanism, operator controlled means for braking the disconnected wheel, a steering wheel arranged at the front of the frame in line with one of the driving wheels, means for operating the steering wheel motor means carried by the frame for driving said wheels, and an operator-operated brake coacting with the wheel which is disconnectable from the motor means.

8. A motor agricultural machine comprising a frame, driving wheels supporting the rear end of the frame and arranged in transverse axial alinement, a drive shaft carried by the frame, one end of the shaft being connected to one of the drive wheel and clutch means connecting the other end of the shaft and the other drive wheel and operable to disconnect such other drive wheel at will from the shaft, motor means carried by the frame and connections between the motor means and the drive shaft, an operator-operated brake for coacting with the wheel which is disconnectable from the drive shaft, a steering wheel arranged at the front of the frame in line with one of the driving wheels and means for operating the steering wheel.

In testimony whereof, I have hereunto signed my name, at Syracuse, in the county of Onondaga, and State of New York, this 22nd day of March, 1928.

CHARLES S. BROWN.